United States Patent [19]

Marchal et al.

[11] 3,904,514

[45] *Sept. 9, 1975

[54] GAS-COOLING PROCESS AND ITS USES

[75] Inventors: Philippe Albert Hippolyte Marchal, Boulogne; Jacques Louis Paul Simonnet, Gif-sur-Yvette; Jean Prudent Fernand Rene Verrien, Paris, all of France

[73] Assignees: Bertin & Cie, Plaisir; Entreprise de Recherches et d'Activities Petrolieres (ELF), Paris, both of France

[ * ] Notice: The portion of the term of this patent subsequent to Apr. 4, 1989, has been disclaimed.

[22] Filed: Jan. 7, 1974

[21] Appl. No.: 431,057

Related U.S. Application Data

[60] Continuation of Ser. Nos. 201,993, Nov. 23, 1971, abandoned, Division of Ser. No. 845,018, July 25, 1969, Pat. No. 3,653,225.

[52] U.S. Cl. .......................... 208/340; 62/11; 62/86
[51] Int. Cl. ............................................... C10g 5/06
[58] Field of Search .......... 208/340; 62/86, 88, 401, 62/467, 11

[56] References Cited

UNITED STATES PATENTS

| | | | |
|---|---|---|---|
| 2,765,045 | 10/1956 | Meyers | 208/340 |
| 2,825,204 | 3/1958 | Kadosch et al. | 60/263 |
| 3,526,099 | 9/1970 | Pavlin et al. | 62/88 |
| 3,541,801 | 11/1970 | Marchal et al. | 62/5 |
| 3,653,225 | 4/1972 | Marchal et al. | 62/88 |

*Primary Examiner*—Herbert Levine
*Attorney, Agent, or Firm*—A. W. Breiner

[57] ABSTRACT

A gas-cooling process wherein a pressurized gas jet delivered by an injector across a break in continuity is collected in one or more tubes whose inlet aperture faces the injector and in which the collected gas is pulsated and heated by compressive wave phenomena to a temperature higher than that of the original jet, while impellant gas, removed at the level of the break in continuity via a suitable by-pass, is expanded in relation to the original jet and brought to a lower temperature than the latter.

13 Claims, 17 Drawing Figures

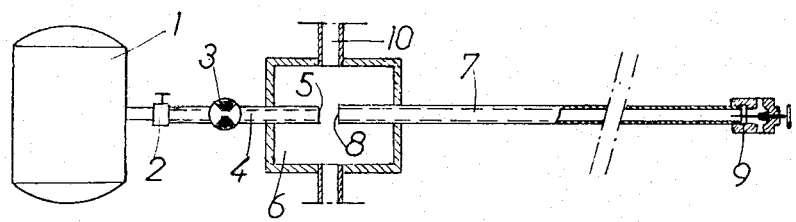
FIG.:1
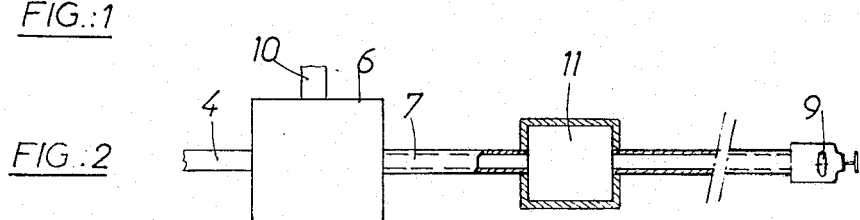
FIG.:2
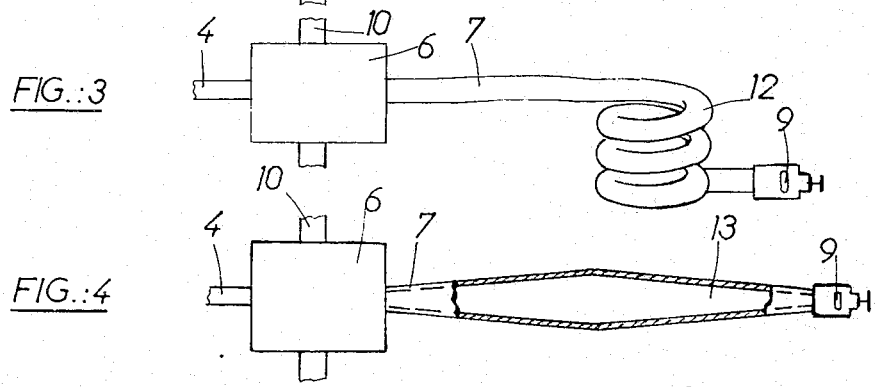
FIG.:3
FIG.:4
FIG.:5
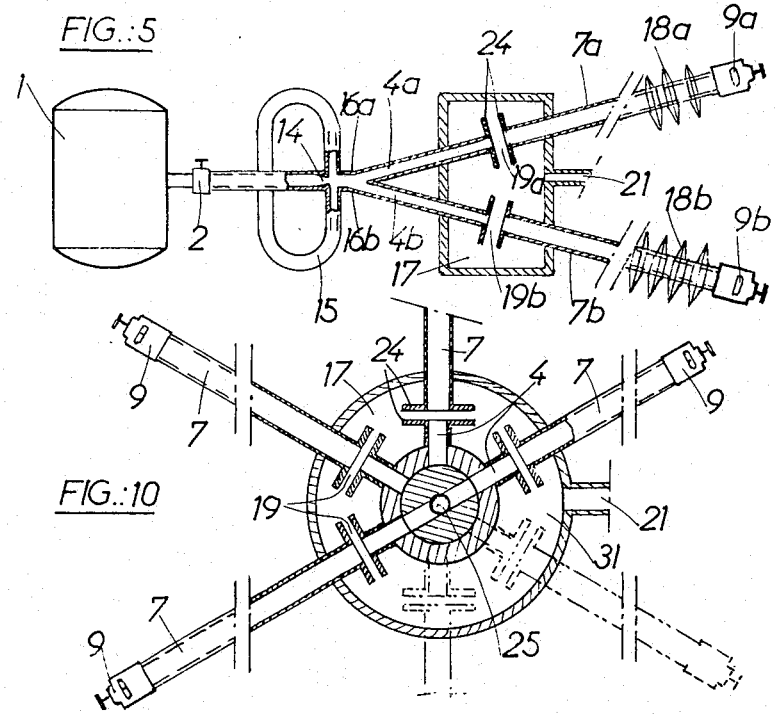
FIG.:10

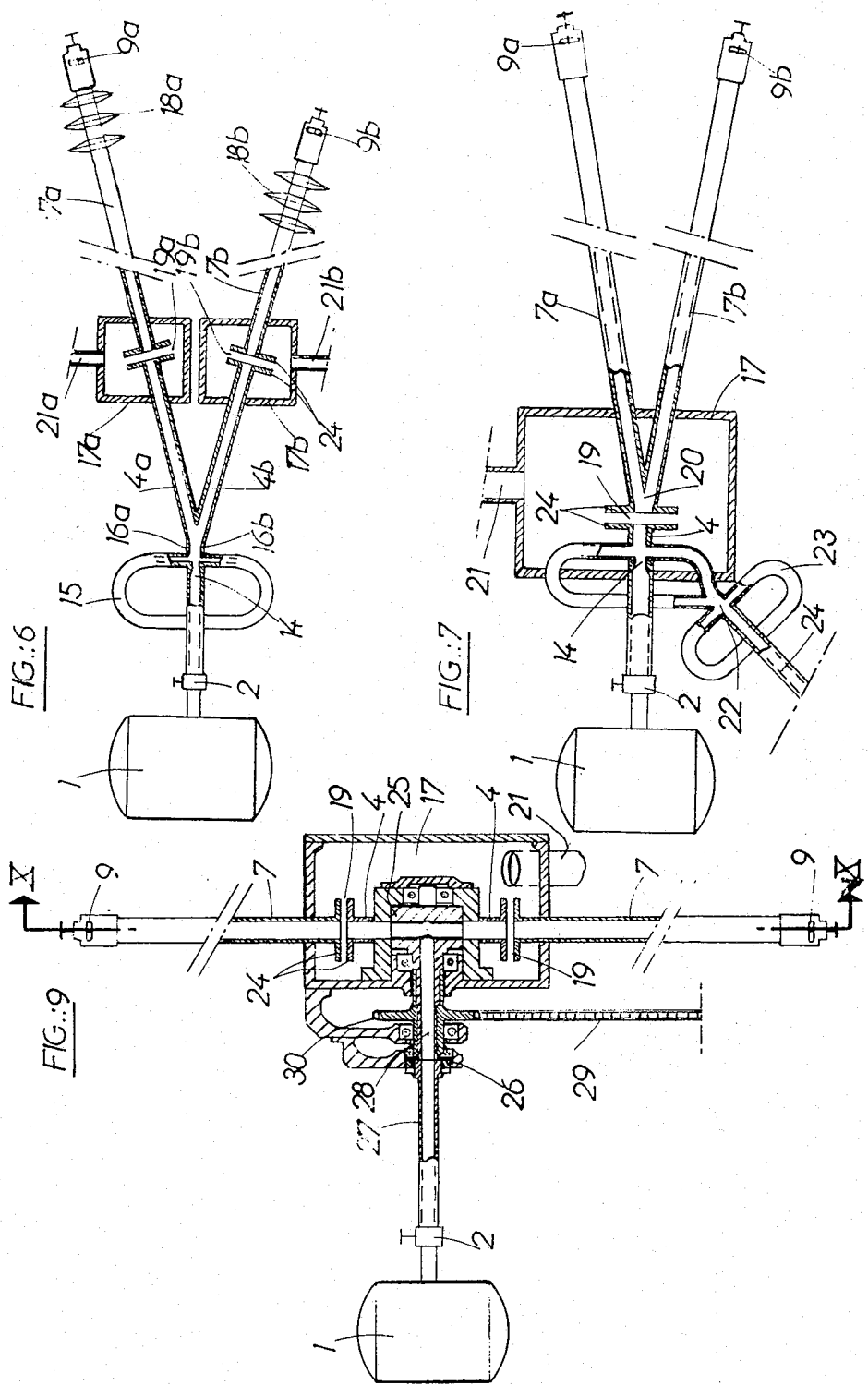

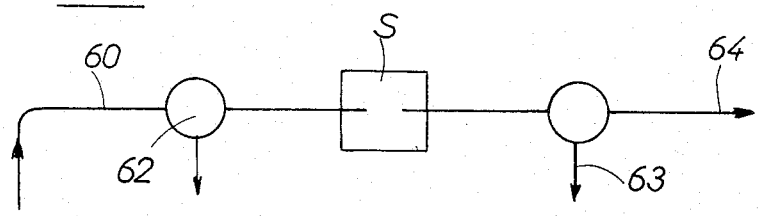
FIG.:14
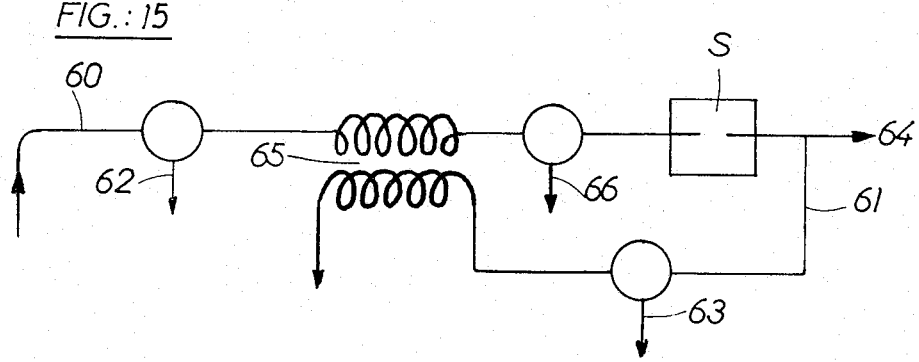
FIG.:15
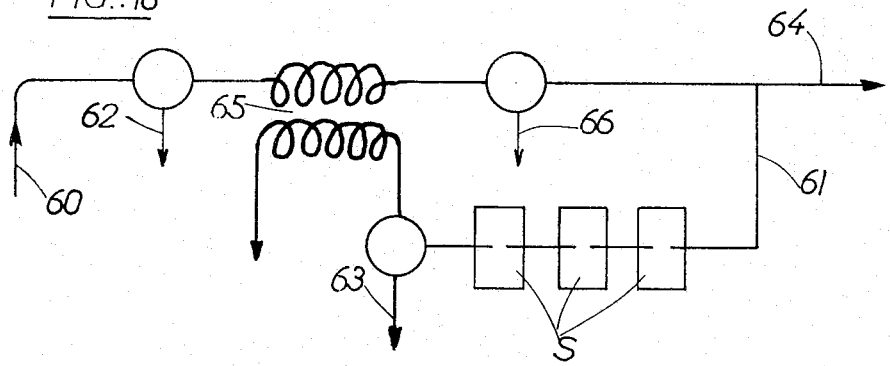
FIG.:16
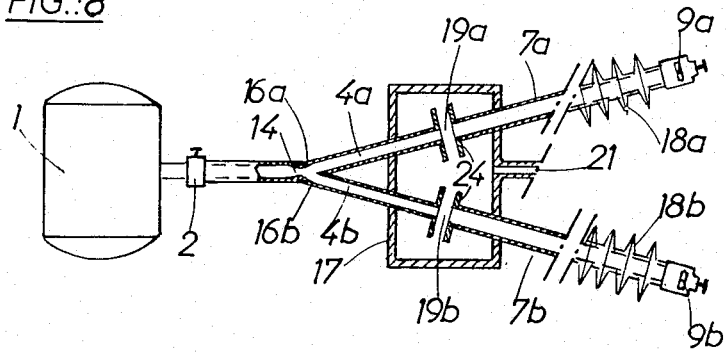
FIG.:8

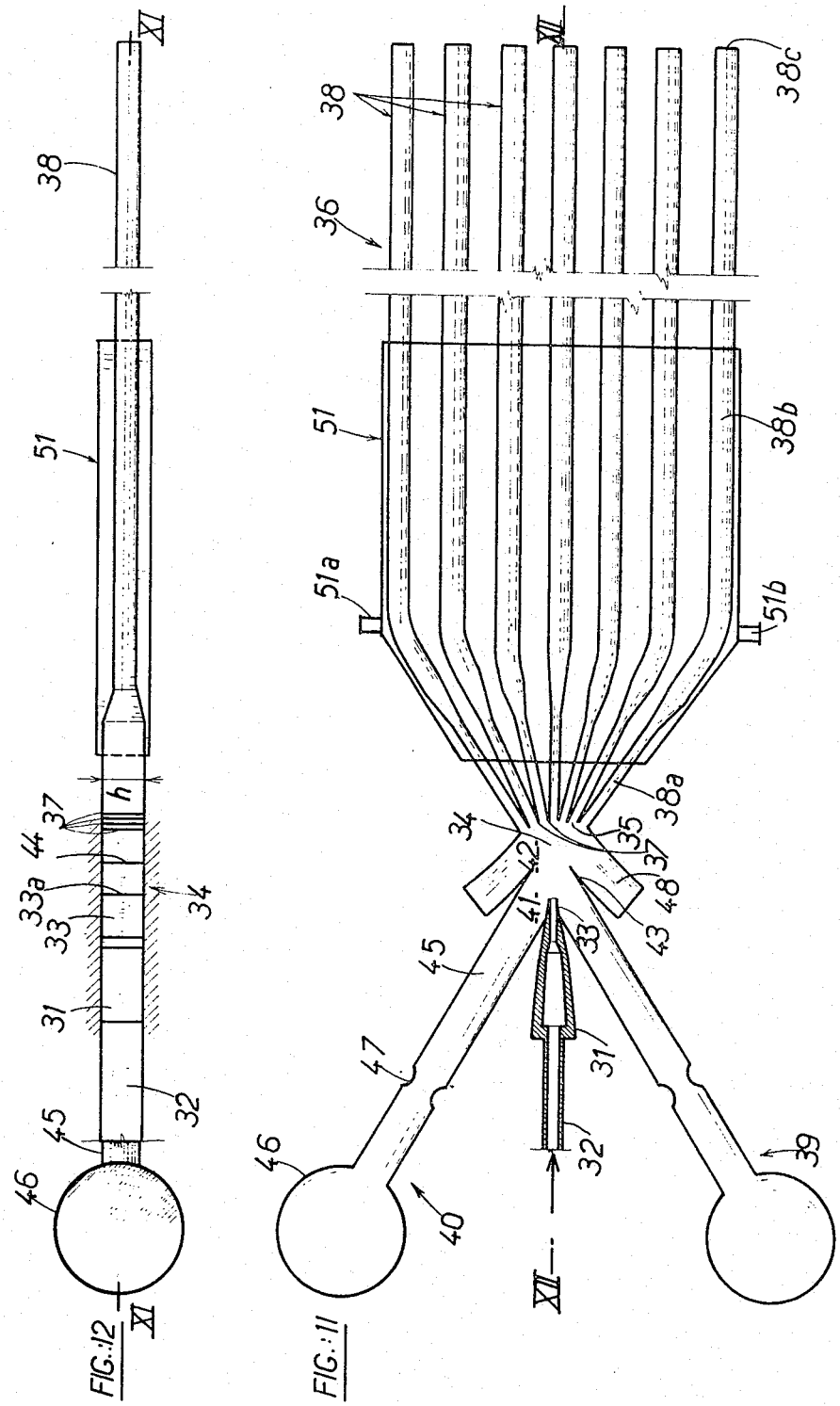

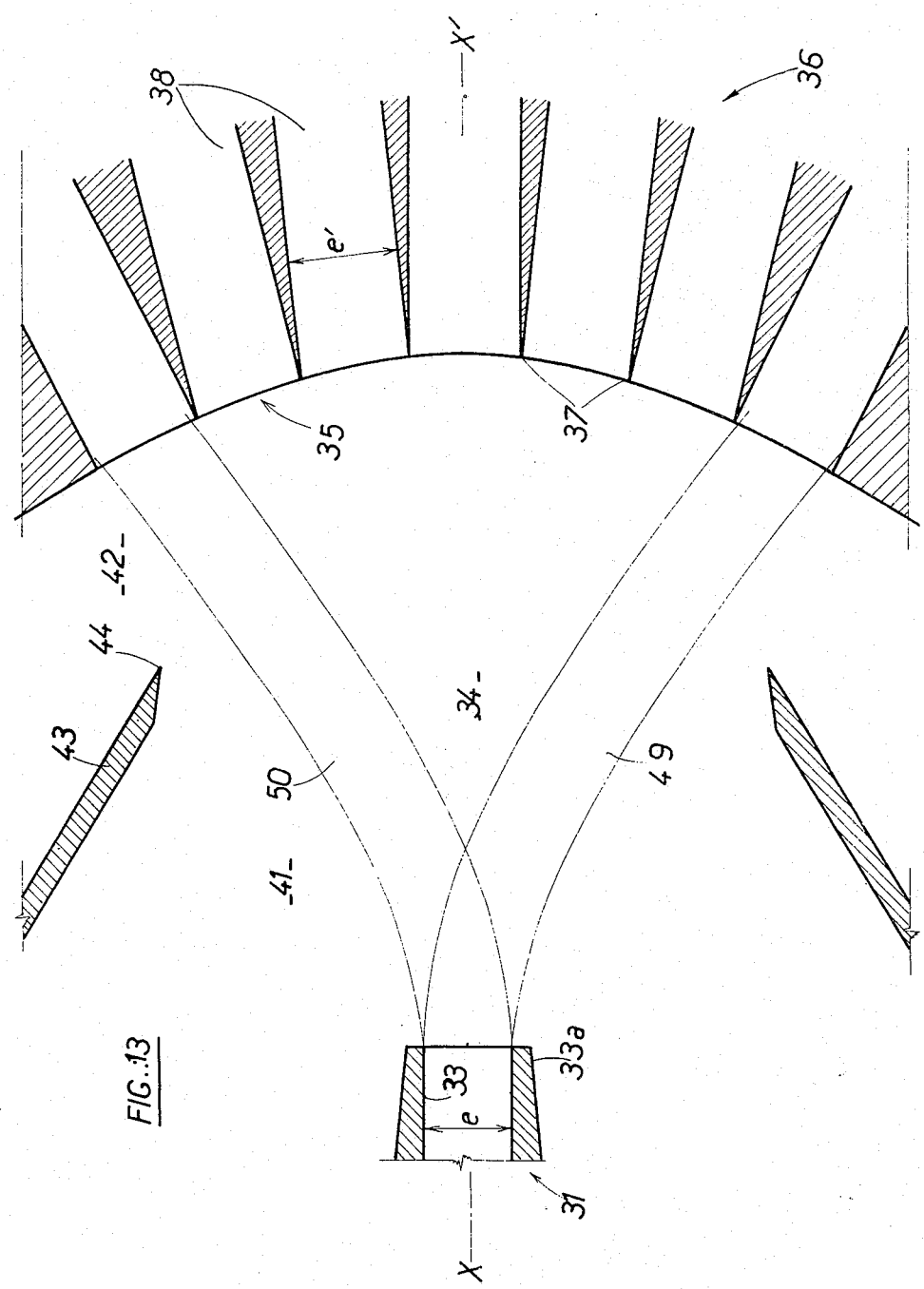

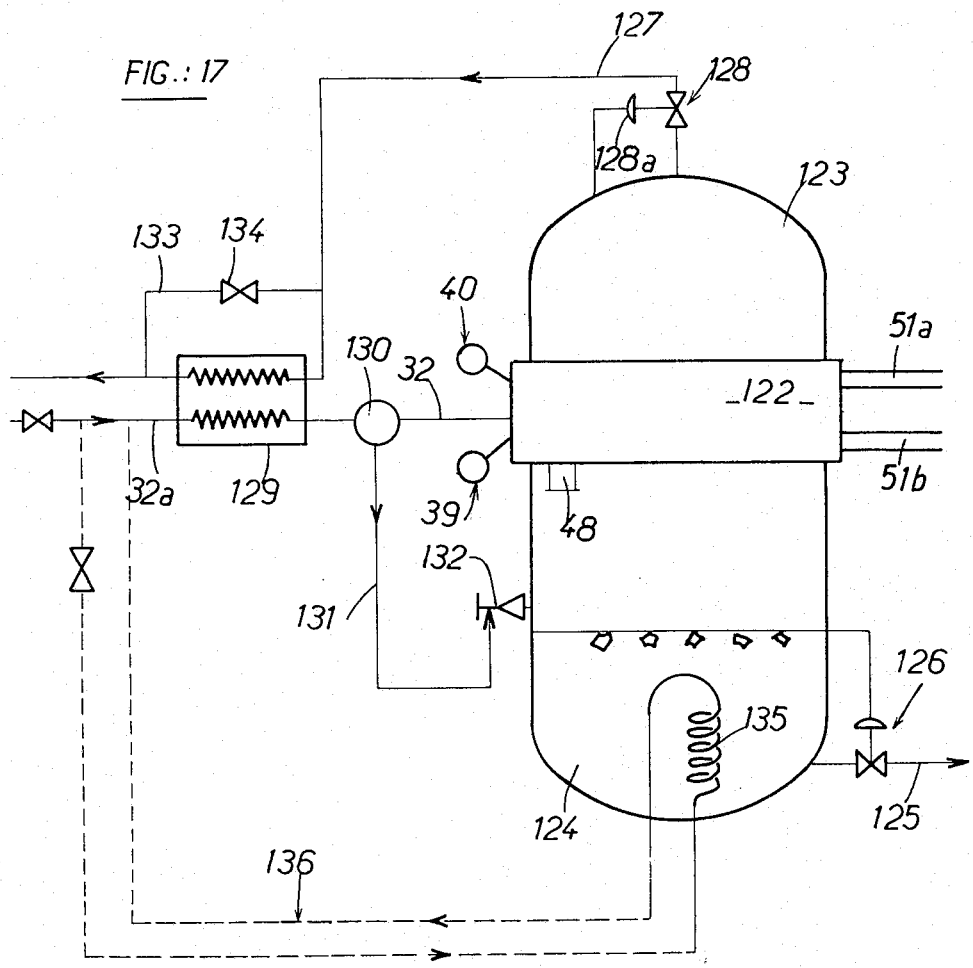
FIG.: 17

GAS-COOLING PROCESS AND ITS USES

This is a continuation of application Ser. No. 201,393 filed Nov. 23, 1971 now abandoned. The invention is a divisional of the invention claimed and described in application Ser. No. 845,018 filed July 25, 1969, now U.S. Pat. No. 3,653,225.

This invention relates to systems of the kind disclosed in Marchal et al. U.S. Pat. No. 3,541,801 and which are adapted to subdivide a compressed gas flow at a certain temperature into a first flow of lower temperature and a second flow of higher temperature, the latter flow possibly being low or even zero, so that the systems behave in effect like gas-cooling apparatuses. One of the main features of the systems to which the aforementioned patent relates is that they operate on pulsating gas flows, using the physical phenomena deriving therefrom; the pulsating flows can be produced from continuous initial flows by means of suitable control elements, inter alia aerodynamic bistables, operating by the periodic deflection of the initial continuous gas flow and the conversion thereof into pulsating flows, such bistables forming genuine fluid switches and if necessary dispensing with all mechanical moving members, as disclosed in Kadosch et al. U.S. Pat. No. 2,825,204.

According to the present invention a pressurised gas jet delivered by an injector across a break in continuity is collected in one or more tubes whose inlet aperture faces the injector and in which the collected gas is pulsated and heated by compressive wave phenomena to a temperature higher than that of the original jet, while impellent gas, removed at the level of the break in continuity via a suitable by-pass, is expanded in relation to the original jet and brought to a lower temperature than the latter.

Preferably, the or each oscillatory "hot" tube is disposed substantially in the line of continuation of the gas injector and has at its end opposite from the inlet aperture an advantageously adjustable obturating or at least constricting end; the "cold" by-pass comprises a chamber enclosing the break in continuity and the adjacent end portions of the injector and the or each hot tube.

In one embodiment of the present invention, two receiving tubes forming a fork extend from a chamber to which the injector delivers a jet which is deflected alternately to the arms of the fork by an aerodynamic fluid bistable, thus producing compressive wave phenomena in the tubes. The expanded and cooled gas is taken from the chamber.

It has been found that gas cooling can be substantially improved by substituting for the two forked tubes a plurality of receiving tubes which are disposed side-by-side, preferably in the shape of a fan, and whose inlet apertures are separated by sharp edges, the jet being oscillated at a predetermined frequency so that it sweeps the inlet apertures.

Advantageously the injector comprises a nozzle in the form of a slot or rectangle extending perpendicularly to the sweeping plane of the jet; the receiving tubes comprise over a certain length of their inlets portions of straight section also in the form of a rectangle extending perpendicularly to the sweeping plane of the jet.

In one embodiment of the present invention, the oscillatory deflection of the jet is produced by an aerodynamic bistable comprising piloting circuits which determine the frequency of the oscillations.

The present invention also covers cold-producing uses of a system according to the invention, inter-alia for the air conditioning of vehicles and the liquifaction of gases. However, the most advantageous use seems to be for the removal of gasoline or the separation of the condensable products from natural gas, since a substantial proportion of such products is simply wasted at the excess gas burners, for want of an economical recovery means. The present invention provides a recovery means which has the further advantages of being simply and robustly constructed, requiring substantially no maintenance, and using for its operation no other energy than the internal energy of the natural gas.

According to the invention the natural gas when first emitted is delivered to the cooling system or more precisely its injector, the continuous pressurised gas flow being converted into a pulsating flow, gas being expanded and cooled in the cold by-pass chamber to produce appreciable condensation and gasoline recovery.

In the accompanying drawings:

FIG. 1 is a diagrammatic sectional view showing the main constituent elements of the system according to the invention;

FIGS. 2–4 illustrate three variant embodiments of a constructional detail of the system shown in FIG. 1;

FIGS. 5–8 are diagrammatic sectional views of four variant embodiments using an aerodynamic bistable control system;

FIG. 9 is an analogous view of a variant embodiment;

FIG. 10 is a cross-section, taken along the line X—X in FIG. 9;

FIG. 11 illustrates diagrammatically an improved expansion and cooling system according to the invention, taken in section along the line XI—XI in FIG. 12;

FIG. 12 is a sectional view, taken along the line XII—XII in FIG. 11;

FIG. 13 is a partial view analogous to FIG. 11, showing the chamber to an enlarged scale;

FIGS. 14–16 diagrammatically illustrate three methods of using the invention for the removal of gasoline, and FIG. 17 is a circuit diagram of an apparatus for the removal of gasoline comprising the system illustrated in FIGS. 11 and 12.

The system illustrated in FIG. 1 comprises a pressurised gas source 1 which is shown as a reservoir in the drawing, but could be anything else, for instance a compressor. After leaving an adjustable expansion valve 2, the continuous gas flow is converted by a rotary needle valve 3 or some other suitable member into a pulsating flow which flows through an injector tube 4 discharging at its end 5 into a chamber 6 facing inlet aperture 8 of a receiving tube 7 terminating in an adjustable diaphragm 9. One or more removal conduits 10 are connected to the chamber 6. The relatively long receiving tube 7 is substantially coaxial, at least at its inlet end, with the injector tube, and the diameter of the receiving tube 7 is greater than that of the injector tube 4, so that the pulsating flux leaving the latter and passing across the break in continuity 5–8 is collected with the minimum loss.

The wave nature of the successive surges of pulsating gas injected into the receiving tube 7, each surge acting like a fluid piston thrown into the tube, its shock being absorbed as it moves along the tube, produces heating, with a corresponding rise in temperature, so that the tube 7 can be called hot. Vice versa, the by-pass from the break in continuity 5–8 formed by the chamber 6 and the removal conduit 10 is the place where gas is expanded, with a corresponding drop in temperature, so that the by-pass can be called cold. Clearly, the words hot and cold are purely relative and are used in relation to the gas injected at the place 4.

At the limit, when the diaphragm 9 is in the completely obturated position, the receiving tube 7 has no flow and behaves merely like a heat generator, the whole flow passing through the by-pass 6–10 with a marked drop in temperature in comparison with the flow injected at 4. Experience shows that the opening of the diaphragm 9 produces an intensified degree of cooling in the chamber 6, this being of course at the expense of the cold flow, which is reduced in relation to the initial flow by the hot fraction delivered by the diaphragm 9. Adjustment of the diaphragm 9 therefore enables the reduction in temperature and the cold flow to be metered in the opposite direction. Of course, when fully open, the diaphragm 9 still has a substantially smaller flow section than the straight section of the receiving tube 7.

In the variant shown in FIG. 2, the receiving tube 7 has a widened enclosure or chamber 11 which increases the yield of the system, as experience has shown.

The overall length of the system can be reduced by constructing at least a portion of the receiving tube 7 in the form of a coil, as shown at 12 in FIG. 3.

In the variant illustrated in FIG. 4, the tube 7 has over a section 13 thereof a section which first increases, then decreases.

In the embodiments disclosed hereinbefore, the hottest portions of the receiving tube 7 can be formed with fins (not shown), to encourage heat exchanges with the surrounding medium.

Unlike the preceding embodiments, the embodiment illustrated in FIG. 5 has a forked double injector tube having arms 4a, 4b, a fluid bistable of a known type, as disclosed in the afore-mentioned French Pat. No. 1,555,617, being substituted for the rotary needle valve. As a brief reminder, a bistable of the kind specified mainly comprises a rectangular pipe 14 for accelerating the pressurised gas, the outlet of the pipe 14 having two opposite apertures interconnected by a loop 15.

The operation of a bistable of the kind specified is known. When the compressed gas first arrives in the pipe 14, the flattened rectangular jet escaping therefrom plays at random on one or the other of inclined walls 16a, 16b which continue the pipe 14 and bound the outside of the injector arms 4a, 4b. Assuming, for instance, that the jet plays on the wall 16a, the jet acquires overspeed thereon and causes at that place a negative pressure which balances the centrifugal force due to the deflection. Since the negative pressure is transmitted via an orifice in the wall 16a and the loop 15 to the opposite orifice in the wall 16b, the equilibrium is broken and the jet plays against the wall 16b, and so on, the jet oscillating between these two positions with a frequency which is a function of the length of the loop 15 and its response time. Two pulsating flows of identical frequency, but-out-of-phase, are therefore finally collected in the injector arms 4a, 4b which terminate in a circular section and follow the inclined walls 16a, 16b.

The injector tube arms 4a, 4b are continued, with gaps 19a, 19b, by receiving tubes 7a, 7b terminating in adjustable diaphragms 9a, 9b, fins 18a, 18b being provided at suitable places. Disposed around the gaps 19a, 19b, at whose edges small so-called "shock" plates 24 are disposed which stop or reflect the shock waves propagated from the aperture of the tubes 4a, 4b, is a single chamber 17 to which a conduit 21 is attached for removing the cold flow.

Of course, the single chamber 17 can be replaced by independent chambers, as 17a, 17b in FIG. 6, each chamber having its gas-removing conduits 21a, 21b.

Alternatively, as shown in FIG. 7, the gap 19 can be placed upstream of the forking 20 of the receiving tubes 7a, 7b, in which case the injector tube is reduced to a very short section in the continuation of the pipe 14.

In this embodiment the deflection of the jet coming from the pipe 14 is not controlled by a single loop connecting the opposite apertures, as in the preceding embodiments, but by a pilot bistable 22 having a control loop 23 and receiving via a conduit 24 a continuous flow which can come inter alia from the source 1.

Alternatively, there need be no control apertures downstream of the pipe 14 and no ancillary ducting systems.

The action of the bistable can also be based on the natural properties of fluid flows which tend to stick to a convex wall (Coanda effect) and to be separated therefrom as a result of the formation of boundary layers at relative excess pressure. FIG. 8 illustrates a variant embodiment of this kind.

In the embodiment illustrated in FIGS. 9 and 10, a continuous flow is again converted into a pulsating flow by means of a mechanical moving member, in this case a rotary distributor 25 receiving the continuous flow in its axis and feeding radially into a plurality of injector tubes 4 which are disposed in the form of a star and followed by individual receiving tubes 27 with terminal adjustable diaphragm 9. The gaps 19, having small shock plates 24 at their edges, are in the same cylindrical cold chamber 17 having a gas-removing conduit 21.

The pressurised gas inlet is made sealing-tight by a rotary gasket 26 interposed between the adjacent ends of a fixed duct 27 and a coaxial rotary duct 28, while the rotary assembly is driven by a chain 29 extending over a pinion 30.

Clearly, other kinds of rotary distributors could be used which are adapted to convert a continuous inlet flow into a plurality of pulsating outlet flows, as, for instance, the system disclosed with relation to FIGS. 8 and 9 of the afore-mentioned French Pat. No. 1,037,906.

The system illustrated in FIGS. 11–13 comprises an injector 31 to which a pressurised gas is supplied from a pipe 32 and which has rectangular nozzles 33 of small width $e$ and height $h$. The pressurised gas passing through the nozzle forms a sonic jet in a chamber 34 bounded, facing the nozzle 33, by the inlet apertures 35 of a bunch of receiving tubes 36. The apertures 35 are also rectangular, of height $h$ and width $e'$; they are disposed side-by-side, forming an arc centered on the axis X–XI of the injector 31 and separated by sharp edges 37. The tubes 38 forming the bunch 36 extend in the shape of a fan and each comprise a portion 38a of the same rectangular shape as its aperture 35, the portion 38a being connected to a portion 38b of circular section obturated at 38c.

Two piloting circuits 39, 40 disposed on either side of the injector 31 each discharge into the chamber 34 via an aperture 41 separated from the nozzle 33 by a common wall 33a and separated from an outlet aperture 42 of the chamber by a wall 43 having a sharp edge 44. Each of the piloting circuits comprises a tube 45 connected on the one hand to the aperture 41 and on the other to a chamber 46 and comprising a constriction 47. Extending from each of the outlet apertures 42 is a tube 48 which enables the expanded and cooled gas to be removed from the chamber 34.

When the pipe 32 is supplied with a pressurised gas, the jet delivered by the nozzle 33 to the chamber 34 oscillates, a frequency determined by the piloting circuits 39, 40, between two limit positions show diagrammatically at 49 and 50. During this oscillatory movement, the jet sweeps the inlet apertures 35 and produces in the tubes 38 surges which compress and heat the gas initially at rest in the tubes 38. At the same time the impellent gas drops in temperature and is then forced back, after passing the jet, into the chamber 34 and evacuated via the outlets 42 and the tubes 48. This system enables a considerable proportion of the flow (for instance, 90 percent) to be cooled as effectively as the whole flow. However, the resulting drop in temperature is far greater than that which can be obtained with the systems described hereinbefore. This surprising effect seems to be due to the frequency of oscillation of the jet. The Applicants have observed inter alia that a system of particular configuration and dimensions has an optimum frequency which produces the greatest drop in the temperature of the impellent gas, on condition that the frequency is stable.

The frequency mainly depends on the conformation arrangement and dimensions of the piloting circuits 39, 40, more particularly on the length of the tubes 45, the position and size of the constrictions 47 and the volume of the chambers 46. However, other parameters also affect the value of the frequency and more particularly its stability, inter alia the length of the portions 38a of the tubes 38 and the temperature of the tubes 38, since a considerable rise in temperature in the tubes 38 corresponds to the strong drop in pressure and temperature of the impellent gas, and the Applicants have observed that this drop in temperature can be increased and the stability of the frequency improved by vigorously cooling the bunch 36 of tubes, for instance by means of a water-circulating apparatus shown diagrammatically at 51 with its water inlet and discharge pipes 51a, 51b respectively.

If the portions 38a of the tubes 38 are too short, the frequency cannot be stabilised at its optimum value.

The receiver capacity, which is defined by the number and volume of the tubes 38, must be in relation to the flow of gas treated. If this chamber is too small, the drop in pressure and temperature is reduced at high flow rates. For instance, an apparatus adapted to treat a gas flow of the order of 100 g/s, comprising a nozzle 33 having a width $e = 3$ mm and height $h = 21.3$ mm and disposed 25 mm away from receiving apertures 35 of width $e' = 3.8$ mm enables a drop in temperature of the impellent gas of the order of 40°C to be obtained at the optimum oscillation frequency of about 500 cycles, on condition that the bunch 36 comprises seven tubes 38 having a length of 3 metres and a portion 38a having a length of 30 centimetres.

An odd number of tubes 38 is preferably provided, to encourage the instability of the jet and therefore start the oscillations.

The sharp edges 44 co-operate with the wall 33a of the injector to form the inlets of the resonators 39, 40. Their position in relation to the injector and the receiving apartures 35 has a decisive effect on the starting of the oscillations of the jet and on its extreme positions 49, 50. The Applicants have observed that a slight displacement of the edges 44 in relation to their optimum position as shown in FIG. 13, which is drawn to scale, substantially reduces the drop in temperature.

As already stated, the present invention can be used in many ways. That use will now be described by way of example which seems to be particularly advantageous for the removal of gasoline in oil installations.

FIG. 14 diagrammatically illustrates an installation of the kind specified. All the gas leaving the well at high pressure is fed via a conduit 60 to one or more thermal separators according to the invention, shown diagrammatically at S, preferably after passing through an apparatus 62 adapted to separate from the gas the liquid fractions which it may contain. In the thermal separator S, the gas is partly expanded thus bringing its pressure down, for instance, from 150 bars to 120 bars. At the outlet from the thermal separator S, the gasoline condensed by cooling is collected at 63, while the portion which is still gaseous leaves at 64 to be burnt or used in some other way.

The installation can be improved as shown in FIG. 15, by using the cooled gas taken at 61 from the outlet 64 to pre-cool the gas from the well before it enters the thermal separator S. To this end, the cooled gas taken at 61 passes through an exchanger 65 through which the gas coming from the well also flows. A first condensed fraction is therefore collected at 66, upstream of the thermal separator S.

FIG. 16 shows a variant comprising a number of thermal separators S disposed in cascade and in which only a fraction of the gas coming from the well passes through the thermal separators S, so that the other portion of the gas can be recovered at 64 at a pressure close to the outlet pressure of the well; this is an advantage if the gas is to be reinjected into the well. Only that fraction of the gas which passes through the thermal separator will be expanded, for instance, to atmospheric pressure. The level of temperature reached under these conditions will be much lower than that in the preceding systems. If the flow used for cooling is low enough, for instance 10 percent, it can be considered lost. The expansion rate being much higher, a number of thermal separators are conveniently disposed in series.

FIG. 17 illustrates diagrammatically an apparatus for the removal of gasoline from natural gas, comprising a device 122 similar to that illustrated in FIGS. 11–13, whose gas-removing tubes 48 discharge into an enclosure 123. The natural gas introduced via tube 32 into the device 122 leaves cooled via tubes 48, so that a substantial proportion of the liquid products which it contains is condensed and drops at 124 into the bottom of the enclosure 123, where it is recovered via a duct 125 having a constant-level valve 126.

The expanded gas is taken at the top of the enclosure 123 by ducting 127 having a valve 128 controlled by a manostat 128a and is passed to a heat exchanger 129, where it cools the gas coming from the well at 32a. This cooling condenses a small proportion of the gasoline in a separator 130; the condensed product drops into the chamber 123 via a duct 131 having a scavenging valve 132. The exchanger 129 can be put out-of-circuit by a by-pass 133 controlled by a valve 134. If the gasoline is too viscous at 124, it can be heated by a coil 135 supplied via ducting 136 with hot gas taken from the pipe 32a.

We claim:

1. A gas-cooling method comprising the steps of intermittently projecting a gas under pressure in the form of a gaseous jet through a free gap unductedly traversed by said jet into a pulse tube causing said jet to pulsate and allowing said gas to undergo intermittent temperature raising compression and temperature lowering expansion within said tube to separate the cooled gas from the hot gas, and thereafter tapping said cooled gas from an enclosed space communicating with said free gap.

2. The method as claimed in claim 1, wherein said gaseous jet is periodically interrupted.

3. The method as claimed in claim 1, comprising the further step of periodically oscillating said gaseous jet to impart the same with a sweeping motion whereby it intermittently registers with said pulse tube.

4. The method as claimed in claim 1, comprising the further step of cooling said pulse tube.

5. The method as claimed in claim 1, wherein said gas under pressure is natural gas containing gasoline, and said tapped cooled gas contains condensed gasoline.

6. The method as claimed in claim 3, wherein said gas under pressure is natural gas containing gaoline, and said tapped cooled gas contains condensed gasoline.

7. The method as claimed in claim 4, wherein said gas under pressure is natural gas containing gasoline, and said tapped cooled gas contains condensed gasoline.

8. A method of cooling a gas under pressure in an open-circuit system comprising the steps of:
   i. passing the supply gas through an injector;
   ii. establishing a volume of receiving gas within a heat conducting receiver having an open end spaced from said injector by a gap;
   iii. pulsating the stream of supply gas delivered from the injector into said receiver whereby the gas in the receiver undergoes periodically:
      a. compression thereby to increase the temperature thereof,
      b. transfer of heat from the compressed volume of gas through the walls of said receiver for heat removal, and
      c. expansion of the commingled stream of supply gas and receiving gas within said receiver with a decrease in the temperature thereof, said expansion discharging said cooled gas from said receiver into an enclosed space surrounding said gap; and
   iv. removing said gas so cooled from said space.

9. The method as set forth in claim 8 in which said stream of supply gas is oscillated across the open end of the receiver in response to intermittent and opposing compression waves interacting laterally with said stream.

10. The method as set forth in claim 8 in which said stream of supply gas is oscillated across the open end of the receiver in response to compression waves generated by at least one resonating chamber positioned adjacent to said stream.

11. The method as set forth in claim 10 in which said resonating chamber has ducted openings disposed towards said stream of supply gas and so adapted that expansion waves generated by said injector will create compression waves within said at least one resonating chamber to deflect laterally said supply stream.

12. The method as set forth in claim 8 further comprising extracting a minor quantity of the compressed volume of receiving gas from the receiver, thereby to enhance this cooling effect upon the remainder of gas in said system.

13. The method as set forth in claim 8 wherein the supply gas under pressure is natural gas containing gasoline, and cooled gas removed from the space around the gap contains condensed gasoline.

* * * * *

UNITED STATES PATENT OFFICE
CERTIFICATE OF CORRECTION

PATENT NO. : 3,904,514
DATED : September 9, 1975
INVENTOR(S) : Philippe A. H. MARCHAL ET AL It is certified that error appears in the above-identified patent and that said Letters Patent are hereby corrected as shown below:

Title Page, in the heading, the priority claim should read
-- French Application No. 161,906 filed August 5, 1968

French Application of Addition No. 69.18701 filed June

Column 2, line 3, "liquifaction" should read -- liquefaction --.

Column 4, line 64, "X-XI" should read -- X-X' --.

Column 7, line 34, claim 6, "gaoline" should read -- gasoline --.

Signed and Sealed this ninth Day of March 1976

[SEAL]

Attest:

RUTH C. MASON
Attesting Officer

C. MARSHALL DANN
Commissioner of Patents and Trademarks

UNITED STATES PATENT AND TRADEMARK OFFICE
CERTIFICATE OF CORRECTION

PATENT NO. : 3,904,514
DATED : September 9, 1975
INVENTOR(S) : Philippe A. H. MARCHAL ET AL It is certified that error appears in the above-identified patent and that said Letters Patent are hereby corrected as shown below:

Title Page, in the heading, the priority claim should read
-- French Application No. 161,906 filed August 5, 1968
-- French Application of Addition No. 69.18701 filed June 6, 1969

Column 2, line 3, "liquifaction" should read -- liquefaction --.

Column 4, line 64, "X-XI" should read -- X-X' --.

Column 7, line 34, claim 6, "gaoline" should read -- gasoline --.

This certificate supersedes Certificate of Correction issued March 9, 1976.

Signed and Sealed this

Twenty-first Day of September 1976

[SEAL]

Attest:

RUTH C. MASON
*Attesting Officer*

C. MARSHALL DANN
*Commissioner of Patents and Trademarks*